(No Model.)
W. KREBS.
CLOSET.
No. 541,486. Patented June 25, 1895.
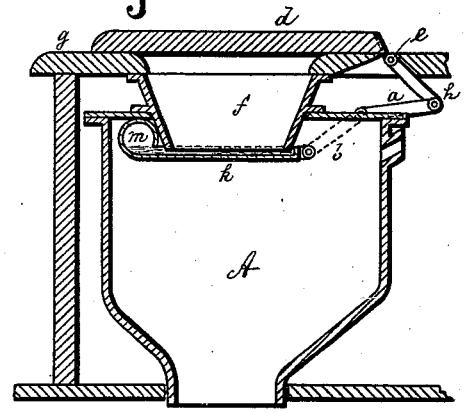
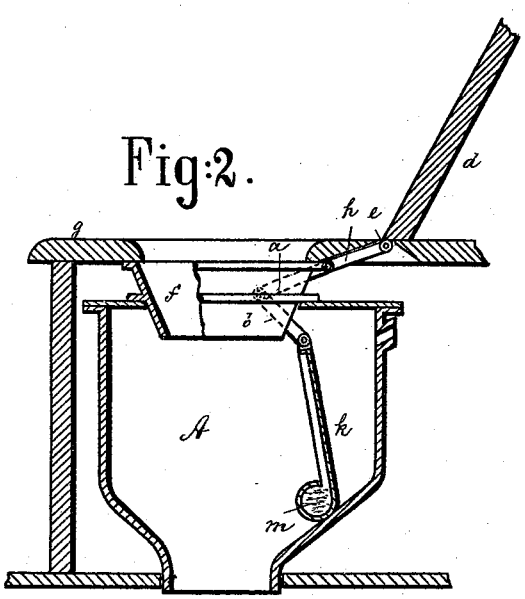
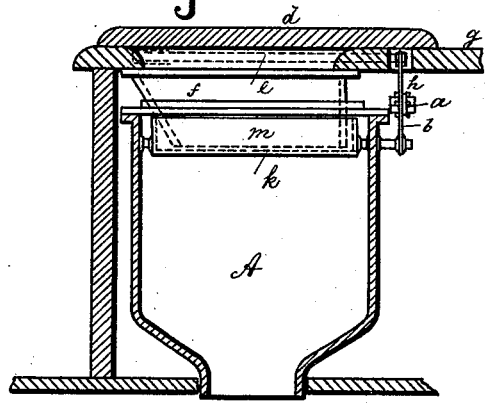
Witnesses:
William Schulz
Theodore Becker
Inventor:
Wilhelm Krebs
by his attorneys
Roeder & Briesen

UNITED STATES PATENT OFFICE.

WILHELM KREBS, OF DUSSELDORF, GERMANY.

CLOSET.

SPECIFICATION forming part of Letters Patent No. 541,486, dated June 25, 1895.

Application filed August 28, 1894. Serial No. 521,559. (No model.)

*To all whom it may concern:*

Be it known that I, WILHELM KREBS, a subject of the German Emperor, residing at Dusseldorf, Germany, have invented certain new and useful Improvements in Closets, of which the following is a specification.

This invention relates to a closet, in which the pan, operated by the lid, is provided with a flushing chamber, to form an air tight seal when the pan is raised.

In the accompanying drawings, Figure 1 is a vertical transverse section of my improved closet, showing the lid lowered. Fig. 2 is a similar section, partly in elevation, with the lid raised; and Fig. 3, a cross-section on line 3 3, Fig. 1.

The letter A represents the bowl of a dry or a wet closet, into the upper end of which projects the hopper $f$. To the seat $g$, of the closet is hinged at $e$, the lid $d$. This lid is connected by lever $h$, and toggles $a$, $b$, to the pan $k$, adapted to close against the lower end of hopper $f$. When the lid is raised (Fig. 2), the pan is lowered, while when the lid is lowered (Fig. 1), the pan is raised, as will be readily understood.

The pan $k$, is flanged, while its free end is curled upward and inward to form a flushing chamber or trough $m$, which opens above the upper face of the pan. The pan is kept permanently filled with water, which will collect in the chamber $m$, when the pan is lowered, and will spread over the pan, when the latter is raised. Thus a water seal is formed between pan and hopper, which prevents the escape of gas and odors. As the pan is always lowered when the seat is raised and the closet is occupied, the water can never become polluted.

Of course, the water on the pan will evaporate from time to time, and must then be replaced, and if desired, any suitable disinfectant may be added.

It will be seen that my improvement may be applied to dry as well as to wet closets, and that thus a tight seal may be formed in places where a water connection is not available.

What I claim is—

1. The combination in a closet of a hopper with a pan having an inwardly curled free edge to form a trough which opens above the upper surface of the pan, substantially as specified.

2. The combination in a closet of a hopper with a pan having an inwardly curled free edge to form a trough which opens above the upper surface of the pan, and with a lid to which the pan is connected, substantially as specified.

In testimony whereof I have signed this specification in the presence of two subscribing witnesses.

WILHELM KREBS.

Witnesses:
 ROB. LIEBER,
 WM. ESSENWEIN.